UNITED STATES PATENT OFFICE.

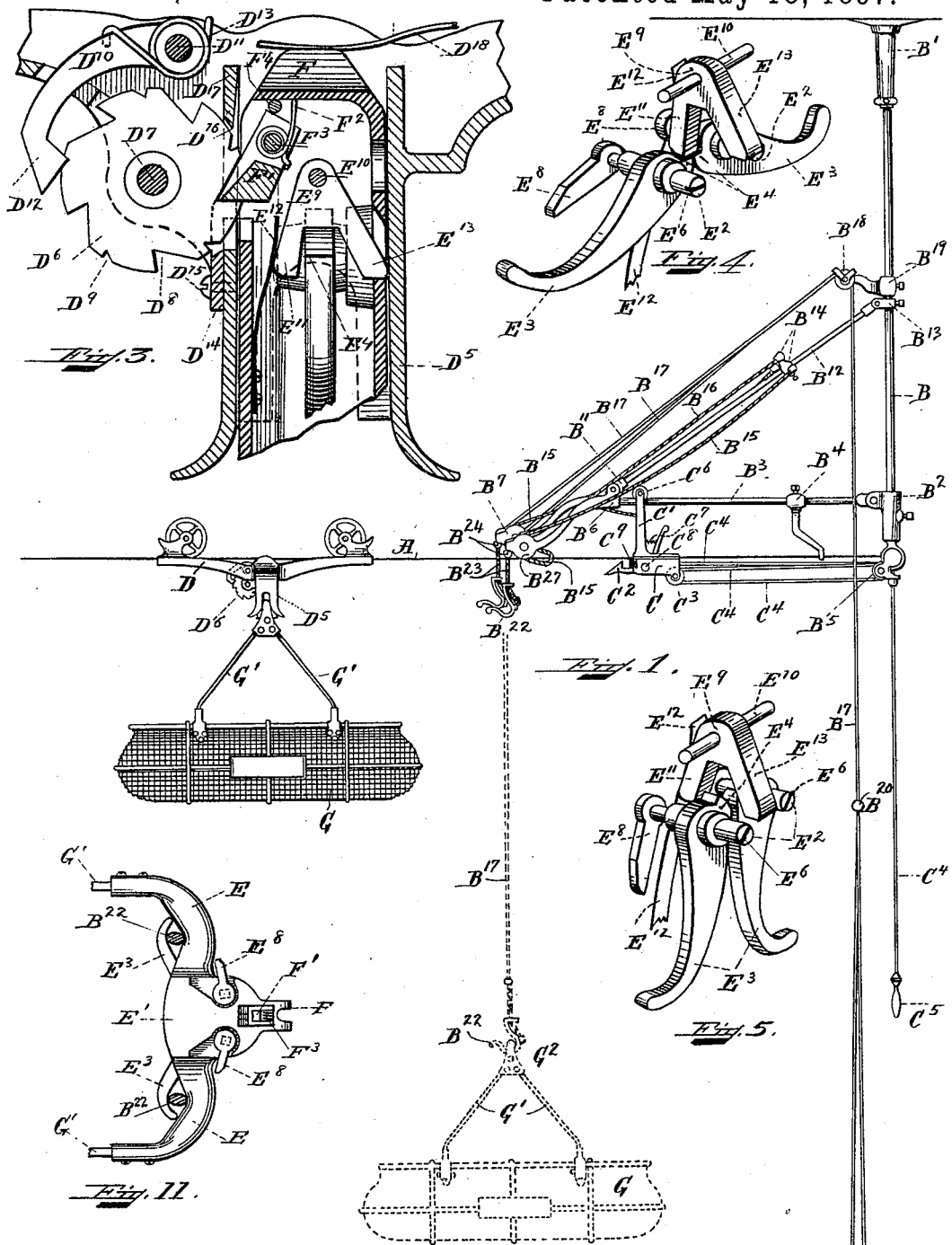

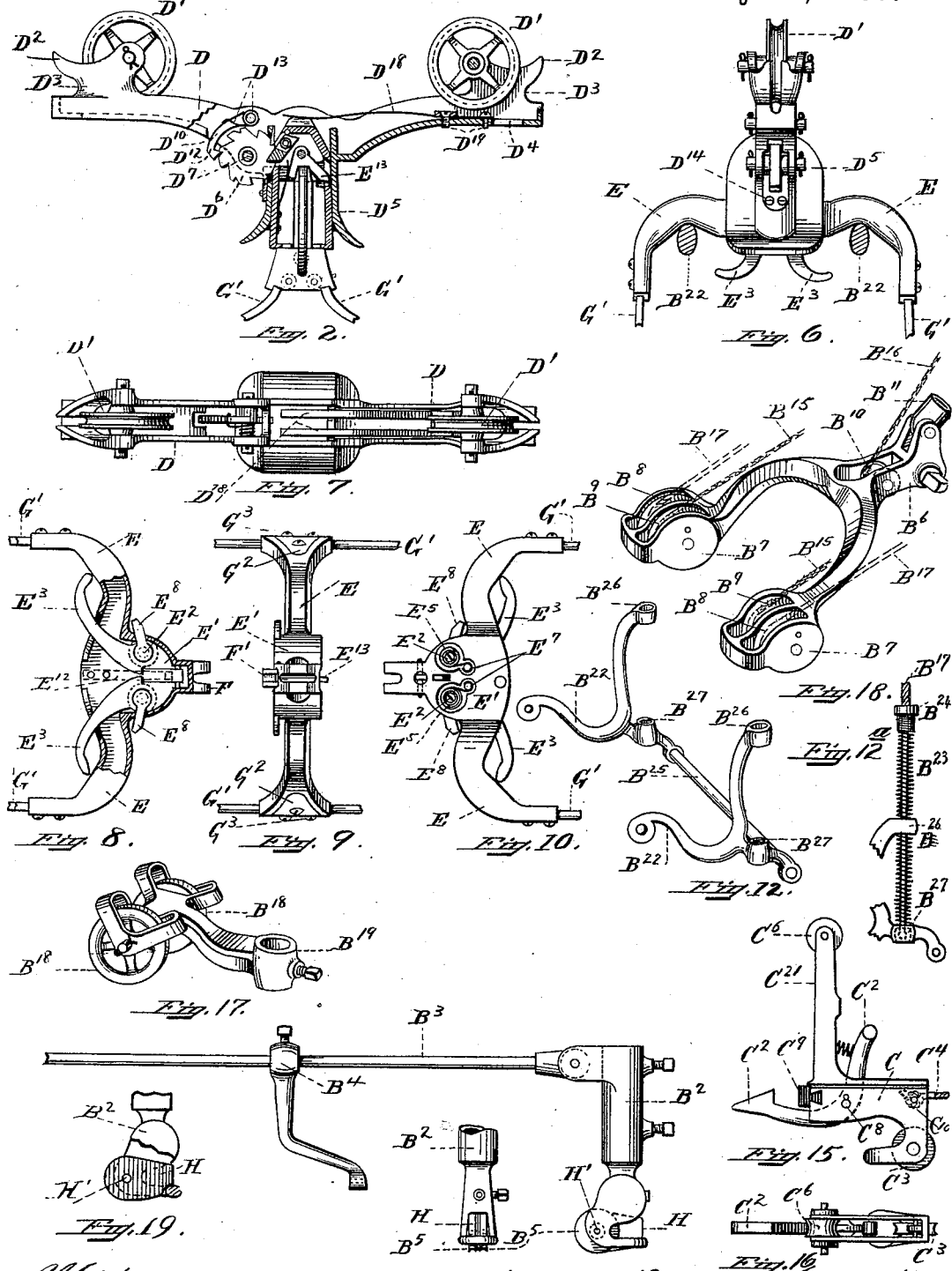

JAMES T. COWLEY, OF LOWELL, MASSACHUSETTS, ASSIGNOR TO THE LAMSON CONSOLIDATED STORE SERVICE COMPANY, OF NEWARK, NEW JERSEY.

CONVEYING APPARATUS.

SPECIFICATION forming part of Letters Patent No. 582,810, dated May 18, 1897.

Application filed August 20, 1896. Serial No. 603,331. (No model.)

*To all whom it may concern:*

Be it known that I, JAMES T. COWLEY, of Lowell, county of Middlesex, and State of Massachusetts, have invented a certain new and useful Improvement in Conveying Apparatus, of which the following is a full, clear, and exact description, which will enable others skilled in the art to which it appertains to make and use the same.

The object of this invention is to carry cash and parcels between the salesman and the cashier in a store, to provide for the placing of a line on which the carrier travels at a greater height than lines are usually located, and also to provide for the lowering of the carrier within reach of the operator.

My invention consists of certain novel features hereinafter described, and particularly pointed out in claims.

Figure 1 is a side elevation of a station at the end of the line, showing the carrier upon the line approaching the station and also showing in dotted line the detachable receptacle lowered down within reach of the operator. Fig. 2 is a side view of the carrier and detachable receptacle, partly in section. Fig. 3 is a sectional view of a portion of the carrier and detachable receptacle. Fig. 4 is a detailed perspective view showing the locking mechanism for the safety-arms and showing the arms in their locked position. Fig. 5 is a detailed perspective view of the locking mechanism for the safety-arms and showing the arms in their unlocked position. Fig. 6 is an end view of the carrier with the basket removed. Fig. 7 is a plan view of the carrier. Fig. 8 is a side view, partly in section, of the yoke of the detachable receptacle. Fig. 9 is a plan view of the same. Fig. 10 is a side view of the yoke of the detachable receptacle, taken on the opposite side to that shown in Fig. 8. Fig. 11 is a side view of the yoke of the detachable receptacle, taken on the opposite side to that shown in Fig. 10 and in engagement with the supporting-hooks by which the carrier is lowered. Fig. 12 is a perspective view of the supporting-hooks. Fig. 12$^A$ is a detailed view of one of the springs which hold the supporting-hooks in their proper relation to the carrier. Figs. 13, 14, 15, 16, 17, 18, and 19 are detailed views of parts of the apparatus to be hereinafter described.

Like letters of reference refer to like parts throughout the several views.

Referring to Fig. 1, A is the way upon which the carrier travels between the stations, and it is connected at the stations to a support $B^2$, which is mounted upon the lower end of the standard B, which is secured to the ceiling or other suitable support by a flange B'. Mounted on the support $B^2$ is an arm $B^3$, which projects outwardly a short distance above the way A, and upon this arm is secured the trip $B^4$, through the upper end of which the arm $B^3$ passes, and said trip is secured in place on the arm $B^3$ by a suitable set-screw, and through the lower end of this trip the way A passes.

$B^5$ represents suitable pulleys mounted in the support $B^2$, around which the cord $C^4$ passes.

$B^6$ represents a fork mounted on the extreme end of the arm $B^3$, having at each end a suitable case $B^7$, within which the pulleys $B^8$ and $B^9$ are journaled. Upon the upper end of this fork and near the arm $B^3$ is pivoted the hollow lug $B^{11}$. To this lug is secured the rod $B^{12}$, which passes upwardly, and the opposite end is secured to the lug $B^{13}$, secured upon the standard B by a suitable set-screw. Upon this rod $B^{12}$ is mounted a lug $B^{14}$, provided with three pockets. Two of these pockets are adapted to hold the end of the motor-elastic $B^{15}$, which passes around the inner pulleys $B^9$ of the forked frame $B^6$, and a loop of said elastic cord rests upon the way A. The other pocket is adapted to hold the end of an elastic $B^{16}$, the opposite end of which is secured to the arm C' of the slide C after passing around the pulley $B^{10}$.

$B^{17}$ represents suitable non-elastic cords which pass around the pulleys $B^{18}$ in the bracket $B^{19}$, located on the standard B, and then pass downwardly around the outer pulleys $B^8$ in the end of the forked frame $B^6$. Upon the ends of these cords are mounted supporting-hooks $B^{22}$. These hooks $B^{22}$ are held together by the rod $B^{25}$ and are provided at their upper ends with eyes $B^{26}$ and at their lower ends with eyes $B^{27}$. The cords $B^{17}$, after passing over the outer pulleys $B^8$, pass downwardly through the eyes $B^{26}$ and $B^{27}$, and each cord is secured in the eye $B^{27}$ by a knot or other suitable fastening. The coiled-wire springs $B^{23}$ are located around the opposite cords $B^{17}$ and pass through the eyes $B^{26}$ and are provided at their upper ends with the button or knot $B^{24}$, which bears against the under side of the casing $B^7$ to the front of the pulley $B^8$, and the lower ends of said coiled-wire springs bear upon the hooks $B^{22}$ above the eyes $B^{27}$. The object of these springs is to hold the supporting-hooks at a suitable distance below the way A and in such position that the yoke E' of the detachable receptacle E, connected to the carrier, will pass over the hooks in position to be engaged by them when the hooks are raised by pulling on the cord $B^{17}$ to disengage the basket from the upper part of the carrier, as hereinafter described. The cords $B^{17}$ are provided with a suitable stop $B^{20}$ to limit the distance that the carrier will be allowed to lower, and are also provided with a suitable handle $B^{21}$, through which the cord $B^{17}$ passes, the said cords and coöperating parts acting as an elevator for raising and lowering the receptacle detachably suspended from the carrier.

Each of the stations is provided with a slide C, provided with an upwardly-extending arm C', which carries the friction-roll $C^6$, adapted to roll upon the arm $B^3$. Within the slide C is mounted the catch $C^2$, mounted upon the pin $C^8$ and provided with a spring $C^7$. Mounted also in this slide is a pulley $C^3$, over which the cord $C^4$ passes. This cord $C^4$ is secured at one end to the slide C by the knot $C^{10}$. This cord passes rearwardly over one of the pulleys $B^5$ in the lower end of the support $B^2$, then forwardly around the pulley $C^3$, and again rearwardly over the other pulley $B^5$ in the lower end of the support $B^2$ and downwardly within reach of the operator, and is provided with a handle $C^5$ on the end. Between the pulleys $B^5$, mounted in the support $B^2$, is a dividing-plate H, supported by a bearing-pin H', on which the pulleys $B^5$ are mounted, and the object of this plate is to keep the cords $C^4$ separated, each on its respective pulley $B^5$, and without this dividing-plate the cords would be liable to crowd on the same pulley, and as the pulleys at this point run in opposite directions the cord would be subject to considerable wear and would also interfere with the proper operation of the slide C.

The carrier D is provided with the supports $D^2$, in which the wheels D' are journaled, and these supports project outwardly at each end and form a recess $D^3$, which is adapted to receive the loop of the motor-elastic $B^{15}$ when the carrier enters one of the stations.

When a carrier enters a station, the catch $C^2$, mounted in the slide C, will engage with the notch $D^4$ in the end of the carrier and hold the carrier, and the hooks $B^{22}$ will be suspended under the yoke E' of the detachable receptacle E. (See Fig. 6.) From the center of the carrier D there extends downwardly a hollow chamber $D^5$, and at one side of this chamber is mounted the ratchet $D^6$ upon the bearing $D^7$. This ratchet is provided with a series of deep notches $D^8$ and another series of shallow notches $D^9$. The pawl $D^{10}$, mounted on the pin $D^{11}$ in the carrier D, is held in engagement with the ratchet by a spring $D^{13}$, and the finger $D^{12}$ of said pawl is adapted to enter into the notches $D^8$ and $D^9$ and prevent the ratchet from turning backward. The basket G of the detachable receptacle E is connected to the yoke E' by the bails G'.

$D^{14}$ is a plate secured to one side of the hollow chamber $D^5$ of the carrier D by the screw $D^{15}$, and the object of this plate is to provide a bearing for the lower end of the pawl F', mounted in the yoke E' of the detachable receptacle E, as hereinafter described. $D^{16}$ is a slot through one side of the chamber $D^5$ of the carrier D, through which the ratchet $D^6$ passes in position to be engaged by the pawl F'. Directly above the ratchet $D^6$ is a crosspiece $D^{17}$, connecting the two sides of the carrier D together and acts as a guard to prevent the pawl F' from springing outwardly, as hereinafter described, and holds it in position to engage with a notch in the ratchet $D^6$ while the detachable receptacle E is being raised preparatory to being lowered, as hereinafter described.

The pawl F' is mounted upon the pin $F^3$ and is provided with a spring $F^2$, which acts to hold said pawl out through the case of the yoke E' of the detachable receptacle E, (see Figs. 3, 9, and 11,) and also when the yoke is engaged with the carrier D to hold said pawl in engagement with the ratchet $D^6$. A stop-pin $F^4$ is placed above the pawl in a suitable position to limit the outward movement of the pawl.

Mounted in the yoke E' of the detachable receptacle E are the arms $E^3$, fastened securely to the studs $E^2$. These arms are provided with shoulders $E^4$ and are held in the position shown in Figs. 4, 8, 10, and 11 by the springs $E^5$. One end of each of these springs is fastened to the stud $E^2$ by being secured in the slot $E^6$ of the stud $E^2$, and the outer end is secured around the pin $E^7$ on the yoke E'. Upon the opposite ends of the studs $E^2$ there are firmly secured fingers $E^8$. These fingers project outwardly, as shown in Figs. 4, 8, 9, 10, and 11, when the gates are held outwardly by the springs $E^5$, as above described. Secured also in the upper part of the detachable receptacle E is a lock $E^9$, mounted on a pivot $E^{10}$, and this lock is provided with the arm $E^{11}$, against which the upper end of the spring $E^{12}$ bears. This lock is also provided with another arm $E^{13}$, which projects outwardly through one side of the case of the yoke E' in position to engage with the chamber $D^5$ of the carrier D when the detachable receptacle is raised up to engagement with the carrier D.

When a carrier enters a station and engages with the catch $C^2$, as above described, the ratchet $D^6$ and the pawl F' are in the position shown in Fig. 3, and the yoke E' will pass over the hooks $B^{22}$, as above described. Now should it be desired to lower the detachable receptacle of the carrier within reach of the operator the operator, by pulling on the cords $B^{17}$ through the connections with the hooks $B^{22}$, will slightly raise the yoke $E'$, with the basket, against the tension of the springs $D^{18}$, secured by suitable screws $D^{19}$ to the carrier D, (see Fig. 2,) and also against the springs $B^{23}$ of the hooks $B^{22}$, and the detachable receptacle E of the carrier will be raised until the pawl $F'$ will engage with a shallow notch $D^9$, and the cross-piece $D^{17}$ will prevent the pawl $F'$ from springing outwardly farther than is necessary to engage with this notch. Now by slacking up on the cords $B^{17}$ the detachable receptacle E will be allowed to drop down, and as the pawl $F'$ is in engagement with one of the shallow notches $D^9$ of the ratchet $D^6$ and as this ratchet rotates by the lowering of the detachable receptacle with the basket the pawl $F'$ will be pressed inwardly by the curved portion of the ratchet directly above the notch $D^9$, and as the detachable receptacle descends the pawl will pass by the supporting-plate $D^{14}$, and the receptacle will be lowered within reach of the operator. These springs $D^{18}$ will assist in revolving the ratchet $D^6$ and constitute the means for moving the detachable receptacle away from the carrier D when the pawl $F'$ engages a shallow notch $D^9$.

When the detachable receptacle E is in engagement with the carrier D, as shown in Figs. 1 and 3, the safety-arms $E^3$ are held open in the position shown in Figs. 5 and 6 by the fingers $E^8$ being pressed inwardly by reason of contact with the sides of the chamber $D^5$ of the carrier D and against the tension of the springs $E^5$, but when the detachable receptacle E is lowered from connection with the carrier D the springs $E^5$ will act to throw the safety-arms $E^3$ out to the position shown in Figs. 4, 8, 10, and 11, and the shoulders $E^4$ on these safety-arms will move downwardly, and the spring $E^{12}$ is the means whereby the arm $E^{11}$ of the lock $E^9$ is moved over the shoulders $E^4$ of the gates $E^3$, thus locking said arms in the position shown in Fig. 4, and the hooks $B^{22}$ will be held securely in engagement with the detachable receptacle E (see Fig. 11) until the arm $E^{11}$ of the lock $E^9$ is released from engagement with the shoulders $E^4$ by again raising the detachable receptacle E up to engagement with the carrier D. (See Figs. 3, 5, and 6.) From the above it will be seen that the arms $E^3$, lock $E^9$, and spring $E^{12}$ constitute the devices which lock the detachable receptacle to the carrier-hooks $B^{22}$ on the ends of the cords $B^{17}$. As this detachable receptacle is raised up toward the carrier the arm $E^{13}$ of the lock $E^9$, by engagement with the chamber $D^5$ of the carrier D, is pushed inwardly, and the arm $E^{11}$ of the lock $E^9$ is pushed away from the shoulders $E^4$ of the safety-arms $E^3$, and said safety-arms are lowered by the fingers $E^8$ engaging with the sides of the chamber $D^5$ of the carrier D. (See Fig. 5.) As the detachable receptacle continues its ascent the pawl $F'$ will engage with one of the deep notches in the ratchet $D^6$, and, releasing the pull on the cords $B^{17}$, the pawl $F'$ will rest on the support $D^{14}$, and the detachable receptacle will be connected to the carrier D and, releasing the pull on the cords $B^{17}$, the springs $B^{23}$ move the hooks $B^{22}$ downwardly away from the yoke $E'$ of the detachable receptacle E, and thus are not in a position to interfere with the travel of the carrier and receptacle in the travel from the station. The detachable receptacle being thus connected to the carrier D, if it is desired to send said carrier to the other station the operator, taking hold of the handle $C^5$, pulls the slide C rearwardly with the carrier D, thus putting the motor-elastics $B^{15}$ and $B^{16}$ under tension, and the catch $C^2$, striking the trip $B^4$, is moved away from the notch $D^4$ in the end of the carrier D, so that the carrier under the force exerted by the elastics $B^{15}$ and $B^{16}$ is propelled from the station along the way A.

I do not limit myself to the arrangement and construction shown, as the same may be varied without departing from the spirit of my invention.

Having thus ascertained the nature of my invention, what I claim as new, and desire to secure by Letters Patent of the United States, is—

1. In a store-service apparatus, a way, a carrier adapted to travel thereon, a receptacle detachably suspended therefrom, a ratchet and pawl located on said carrier, and a pawl located on said detachable receptacle adapted to coöperate with said ratchet and to hold said receptacle connected to said carrier.

2. In a store-service apparatus, a way, a carrier adapted to travel thereon, a receptacle detachably suspended therefrom, a ratchet located on said carrier and having deep and shallow notches, a pawl for preventing the backward movement of said ratchet, and a pawl located on said detachable receptacle adapted to coöperate with said ratchet, and when in engagement with the deep notches, to hold said detachable receptacle connected to the carrier.

3. In a store-service apparatus, a way, a carrier adapted to travel thereon, a receptacle detachably suspended therefrom, an elevator for raising and lowering the said detachable receptacle and automatic devices on said detachable receptacle for locking it to said elevator when disconnected from the carrier.

4. In a store-service apparatus, a way, a carrier adapted to travel thereon, a receptacle detachably suspended therefrom, an elevator for raising and lowering said detachable receptacle, safety-arms located on said detachable receptacle and adapted to lock the same to said elevator, a lock coöperating with said safety-arms and adapted to lock the arms to said elevator when the detachable receptacle is disengaged from the carrier, and means for moving said lock into its locking position with said arms upon the said disengagement.

5. In a store-service apparatus, a way, a carrier adapted to travel thereon, a receptacle detachably suspended therefrom, an elevator for raising and lowering said detachable receptacle, safety-arms located on said detachable receptacle and adapted to lock the same to said elevator, a lock coöperating with said safety-arms and adapted to lock the arms to said elevator when the detachable receptacle is disengaged from the carrier, and a spring for moving said lock into its locking position with said arms upon the said disengagement.

6. In a store-service apparatus, a way, a carrier adapted to travel thereon, a receptacle detachably suspended therefrom, a ratchet and pawl located on said carrier, a pawl located on said detachable receptacle adapted to coöperate with said ratchet and to hold said detachable receptacle connected to said carrier, and means for moving said detachable receptacle from engagement with the carrier.

7. In a store-service apparatus, a way, a carrier adapted to travel thereon, a receptacle detachably suspended therefrom, a ratchet and pawl located on said carrier, a pawl located on said detachable receptacle adapted to coöperate with said ratchet and to hold said detachable receptacle connected to said carrier, and means located on said carrier for moving said detachable receptacle from engagement with the carrier.

8. In a store-service apparatus, a way, a carrier adapted to travel thereon, a receptacle detachably suspended therefrom, a ratchet and pawl located on said carrier, a pawl located on said detachable receptacle adapted to coöperate with said ratchet and to hold said detachable receptacle connected to said carrier, and flat springs secured to said carrier and adapted to bear on the top of said detachable receptacle for moving said detachable receptacle from engagement with said carrier.

9. In a store-service apparatus, a way, a carrier adapted to travel thereon, a receptacle detachably suspended therefrom, an elevator for raising and lowering said detachable receptacle provided with hooks at the end to engage with the detachable receptacle, and means for holding said hooks below the track and in position to receive the detachable receptacle upon its disengagement from the carrier.

10. In a store-service apparatus, a way, a carrier adapted to travel thereon, a receptacle detachably suspended therefrom, an elevator for raising and lowering said detachable receptacle, and springs acting on said hooks to hold the same below the track and in position to receive the detachable receptacle upon its disengagement from the carrier.

11. In a store-service apparatus, a way, a carrier adapted to travel thereon, a receptacle detachably suspended therefrom, an elevator for raising and lowering said detachable receptacle, studs mounted in said receptacle and provided on opposite ends with safety arms and fingers respectively, and means for moving said safety-arms to their locking position with said elevator when the detachable receptacle is disengaged from the carrier.

12. In a store-service apparatus, a way, a carrier adapted to travel thereon, a receptacle detachably suspended therefrom, an elevator for raising and lowering said detachable receptacle, studs mounted in said receptacle and provided on opposite ends with safety arms and fingers respectively, and springs for moving said safety-arms to their locking position with said elevator when the detachable receptacle is disengaged from the carrier.

13. In a store-service apparatus, a way, a carrier adapted to travel thereon, a receptacle detachably suspended therefrom, a ratchet and pawl located on said carrier, a pawl located on said detachable receptacle adapted to coöperate with said ratchet and to hold said receptacle connected to said carrier, and a guard on said carrier for preventing the pawl on the detachable receptacle from springing outwardly upon the raising of the detachable receptacle preparatory to its being lowered and for holding said pawl in position to engage with a notch in said ratchet.

14. In a store-service apparatus, a way, a carrier adapted to travel thereon, a receptacle detachably suspended therefrom, a ratchet and pawl located on said carrier, a pawl located on said detachable receptacle adapted to coöperate with said ratchet and to hold said receptacle connected to said carrier, and a pin located in said receptacle above said pawl for limiting the outward movement of said pawl.

15. In a store-service apparatus, a way, a support for said way, a carrier adapted to travel on said way, a slide carrying a catch adapted to engage with the carrier, a pulley on said slide, two pulleys mounted in said support, a plate in said support for separating the two pulleys from each other, and a cord connected at one end to the slide for operating the same and passing around one of the pulleys on the support and then forwardly around the pulleys on the slide and then rearwardly around the other pulley on the support, the said plate preventing the portions of the cord passing around the two pulleys on the support from moving from one pulley to the other.

In testimony whereof I have signed my name to this specification, in the presence of two subscribing witnesses, on this 18th day of July, A. D. 1896.

JAMES T. COWLEY.

Witnesses:
A. L. MESSER,
G. G. POLLARD.